J. LOFGREN.
LOCOMOTIVE WIRING FITTING.
APPLICATION FILED DEC. 3, 1914.
1,189,847.
Patented July 4, 1916.
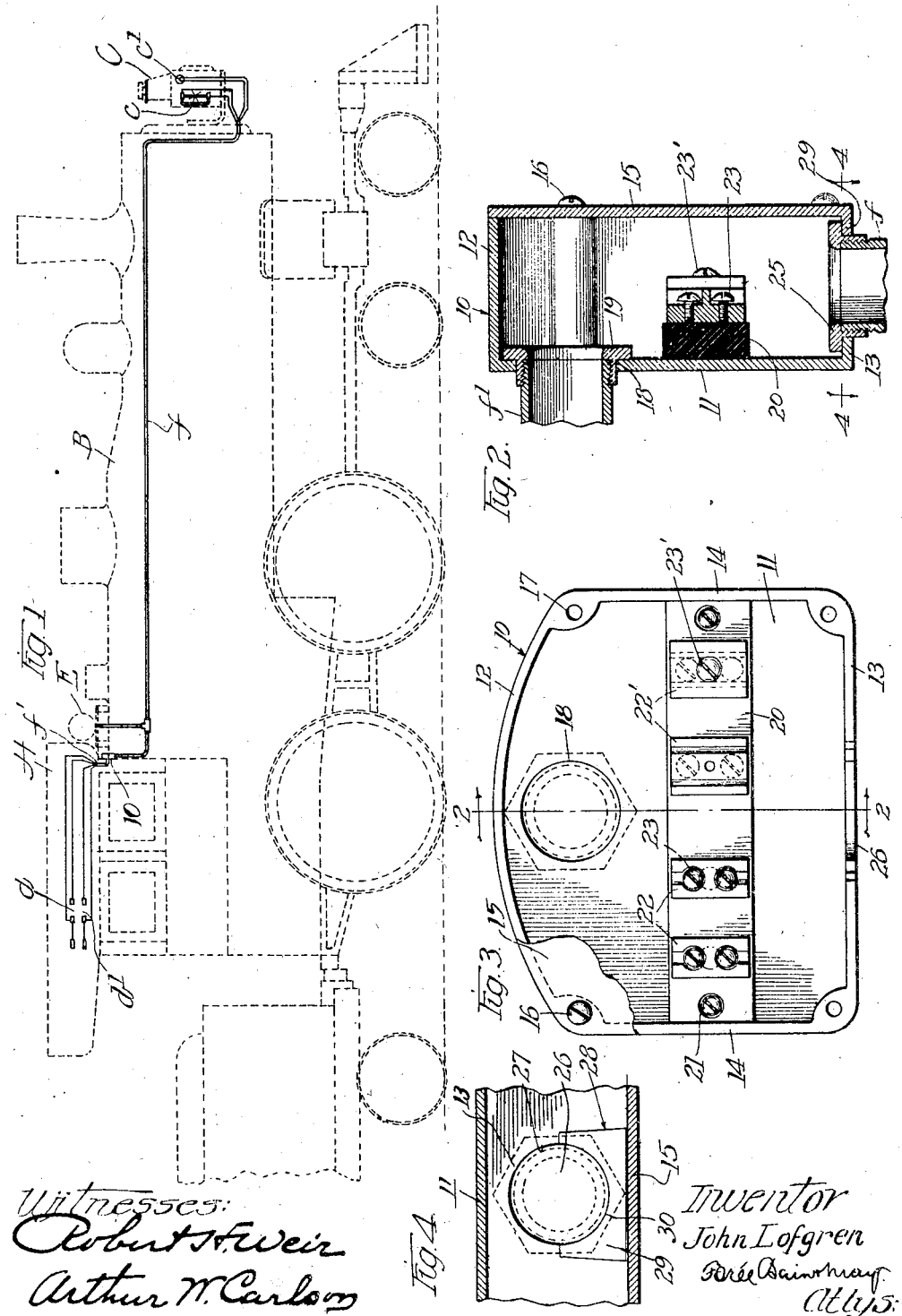

UNITED STATES PATENT OFFICE.

JOHN LOFGREN, OF CHICAGO, ILLINOIS.

LOCOMOTIVE-WIRING FITTING.

1,189,847.  Specification of Letters Patent.  Patented July 4, 1916.

Application filed December 3, 1914. Serial No. 875,284.

*To all whom it may concern:*

Be it known that I, JOHN LOFGREN, a citizen of the United States, residing at Chicago, in the county of Cook and State of Illinois, have invented certain new and useful Improvements in Locomotive-Wiring Fittings, of which the following is a specification.

My invention relates to a fitting for use in connection with the electric wiring of a locomotive, and more particularly to a fitting for connecting engine-carried wiring and cab-carried wiring, especially in the connection of the electric head light wiring with the appropriate switch mechanism in the cab.

In the wiring of a locomotive head light, prior to the practice of my invention, material loss and inconvenience was experienced due to the necessity for severing the wiring connections, and the wiring carrying conduit, each time the locomotive cab was removed from association with the engine, as must frequently be done for necessary engine repairs. In practice the locomotive cab as a whole is made detachable from the engine and for many repair purposes the first necessary step is removal of the cab by lifting it vertically out of place on the engine.

The primary object of my invention is to provide a fitting in association with the engine wiring elements which will permit ready removal of the cab and replacement thereof without in any way disturbing the wiring except by simple disconnection and fresh connection of the appropriate wires at proper terminals.

In the drawings wherein I have illustrated an embodiment of my invention Figure 1 is a schematic view showing a locomotive in dotted lines and diagrammatically illustrating an embodiment of my invention. Fig. 2 is a vertical cross section through a fitting forming an element of my invention, said section taken on line 2—2 of Fig. 3. Fig. 3 is a face view of said fitting with parts of the cover broken away; Fig. 4 is a section on line 4—4 of Fig. 2 with the conduit bushing indicated in dotted lines.

With reference to the locomotive shown it will be understood that the cab A is vertically removable from the engine B in the usual way and that the electric head light C is, in accordance with common practice, provided with a main light-producer $c$ such as an arc lamp and a secondary light producer $c'$ such as an incandescent lamp, two switches $d$ and $d'$ being provided in the engine cab for control of the circuits for these respective lamps, and the lamp circuit being appropriately energized as from the turbine driven electric generator E mounted on the engine.

The wiring for the two lamps is led through a conduit $f$ along the engine, with suitable connections to the generator E and the cab wiring is led through a conduit of which a fragment is indicated at $f'$ in Fig. 1.

In the practice of my invention I mount on the outer wall of the cab a fitting 10 comprising a box having a back wall 11, top and bottom walls 12 and 13, and side walls 14, this box adapted to be overlain and substantially closed by a face plate 15, secured thereon as by screws 16 taking into suitable threaded apertures 17 in the box.

For positioning the box upon the cab and connecting it with the cab carried conduit $f'$ I preferably make in the back wall 11 only a single orifice 18 receiving the bushing 19 that is screwed on to the threaded extremity of the cab carried conduit $f'$, this aperture being located preferably near the top of the casing. Within the casing I mount an insulating block 20 secured as by screws 21 and carrying a suitable plurality, as four, terminals 22 and 22,' the terminals 22 being preferably appropriately constructed for attachment of small wires (for the incandescent lamp) as by means of binding post screws 23 and the terminals 22' being suitably constructed for attachment of larger gage wires (for the arc lamp) as by clamp screws 23'.

The vertical limb or riser of the engine conduit $f$ is likewise provided with a bushing 25, and for reception and retention of said bushing the lower portion of the fitting is especially constructed. In the bottom wall 13 of the casing is made a recess 26 having a semi-circular part 27 opening into an enlarged portion 28 that extends clear to the front edge of the wall 13, and on the face plate 15 of the casing is provided a lug 29, preferably of the same thickness as the bottom wall 13 of the box, arranged to interfit neatly in the recess portion 28 and itself provided with a semi-circular recess 30, complemental to the recess portion 27. Thus when the casing parts are assembled the lower bushing 25 is effectively positioned as indicated in Fig. 2, but when the face plate 15 is removed the bushing receiving recess 27 of the box is left laterally open.

When it is desired to disconnect the cab from the engine, the connecting fitting is left in place on the cab and the wiring leading to the cab is not disturbed, but the face plate 15 is removed, the wires leading into the conduit $f$ are disconnected from the respective terminals, and then the upright limb or riser $f$ of the engine conduit is sprung forward, laterally out of the recess 27, so that the cab may be lifted off bodily from the engine. Of course when the cab is replaced the operation is reversed.

Having described my invention, what I claim is:—

1. A locomotive wiring fitting comprising in combination a metallic box adapted for attachment to the cab and having in its rear wall a receptive opening for the cab conduit bushing and in its bottom wall an edge opening recess providing a portion of a receptive opening for the engine conduit bushing, said opening extending from the edge inwardly a distance greater than the diameter of the engine carried conduit, wire terminals carried by said box, and a cover member for said box providing a bottom portion coöperating with the said recess of the bottom wall of the box and providing a complemental portion of the receptive opening for the engine carried conduit bushing.

2. A locomotive wiring fitting comprising in combination a metallic box having a vertical base wall for attachment to the cab, outwardly projecting bottom, top and side walls, said base wall having a receptive opening for the cab carried conduit bushing, and in the bottom wall an edge opening recess providing a portion of a receptive opening for the engine carried conduit bushing, said opening extending from the edge inwardly a distance greater than the diameter of the engine carried conduit bushing, wiring terminals carried by said box, and a flat cover member coöperating with the projecting edges of the outwardly extending walls and having an inwardly extending forked part coöperating with the said recess in the bottom wall of the box and providing a complemental portion of the receptive opening for the engine carried conduit bushing.

In testimony whereof I hereunto set my hand in the presence of two subscribing witnesses.

JOHN LOFGREN.

In the presence of—
Geo. T. May, Jr.,
Mary F. Allen.